Sept. 15, 1953     H. G. ALTENBURGER     2,651,951
UNIVERSALLY ADAPTABLE DRILL JIG
Filed Sept. 8, 1952     3 Sheets-Sheet 1
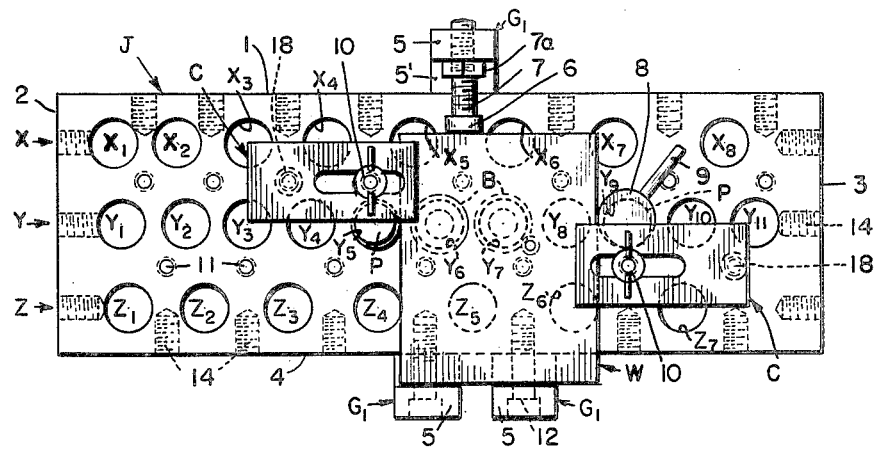
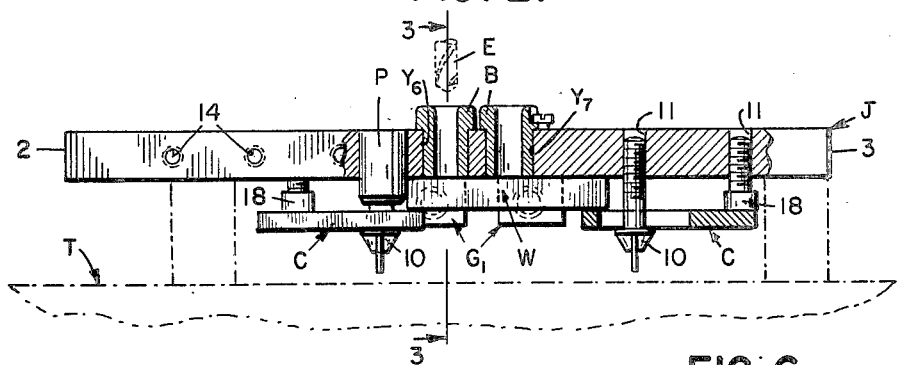
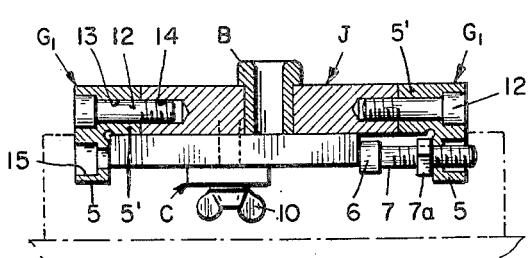
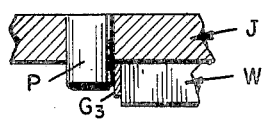
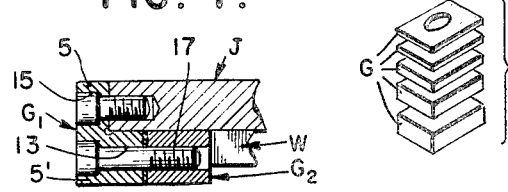
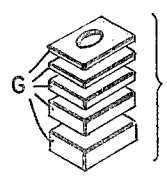
INVENTOR
HERMAN G. ALTENBURGER
BY
ATTORNEY Sept. 15, 1953     H. G. ALTENBURGER     2,651,951
UNIVERSALLY ADAPTABLE DRILL JIG
Filed Sept. 8, 1952     3 Sheets-Sheet 2
FIG. 8.
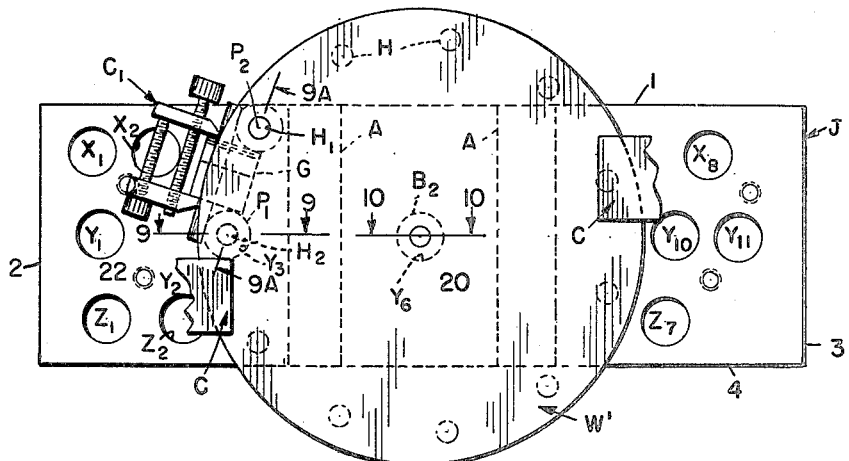
FIG. 9.     FIG. 9A.     FIG. 10.
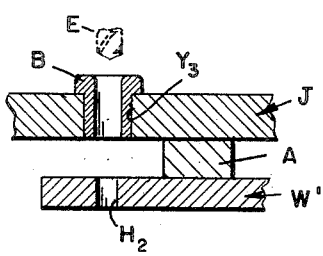 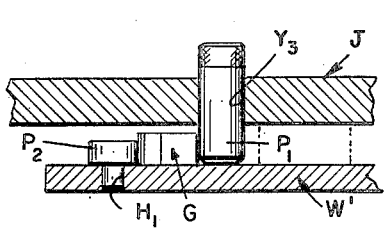 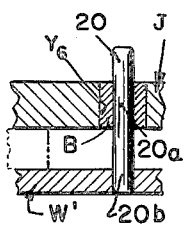
FIG. 11.
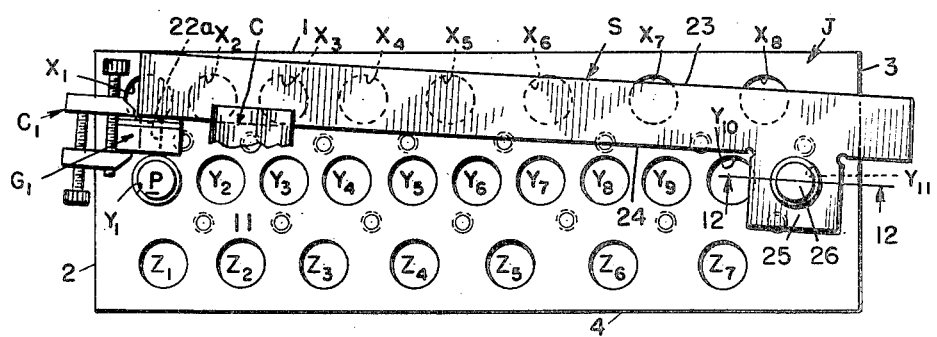
FIG. 12.
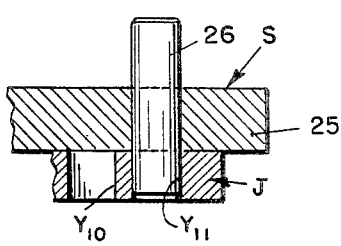
INVENTOR
HERMAN G. ALTENBURGER
BY
ATTORNEY Sept. 15, 1953 H. G. ALTENBURGER 2,651,951
UNIVERSALLY ADAPTABLE DRILL JIG
Filed Sept. 8, 1952 3 Sheets-Sheet 3
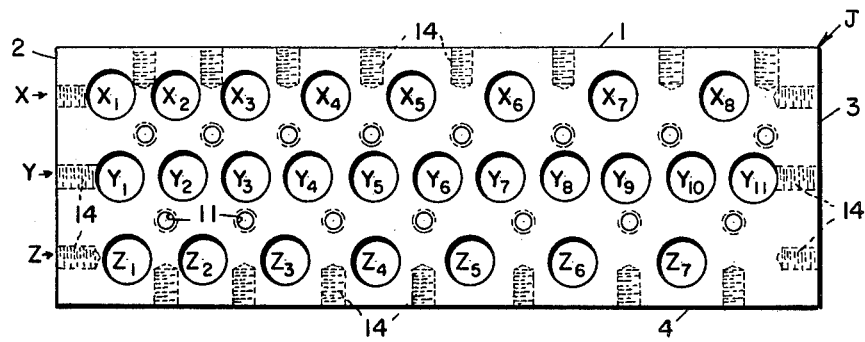
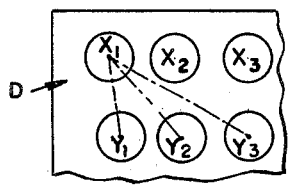
INVENTOR
HERMAN G. ALTENBURGER
BY
ATTORNEY Patented Sept. 15, 1953

2,651,951

UNITED STATES PATENT OFFICE 2,651,951

UNIVERSALLY ADAPTABLE DRILL JIG

Herman G. Altenburger, Montrose, Calif.

Application September 8, 1952, Serial No. 308,306

15 Claims. (Cl. 77—62)

1

This invention relates to and has for a general object the provision of an improved means and method for accurately establishing the position of and jig drilling holes according to a predetermined arrangement and spacing of holes in successive pieces of work, as in the mass production of identical and interchangeable parts and devices, without the use of micrometric adjustments and calculations and yet by means of which precision of size and location of holes is effected with a minimum of labor and calculation.

It has been heretofore deemed necessary to accomplish the aforesaid operations by the employment, in many cases at least, of micrometers in connection with gauge blocks and other devices at the margins and on the surfaces of a jig for engagement with surfaces of a piece of work in order to accurately locate the work relative to the pilot holes in the jig. Obviously, the technique and accuracy of one operator, in adjusting and reading the verniers on the micrometers may vary on the same or different pieces of work, thereby rendering some pieces of work faulty and successive pieces of work unidentical.

Different technicians using the same or similar jigs and associated devices merely multiply the opportunities and possibilities of error and thereby contribute largely to the rejection of parts, loss of labor and material and therefore unnecessary and avoidable economic loss.

Another object is to provide a universally adaptable jig and associated devices which are so designed and capable of use for operation on many different parts of different characteristics that they eliminate the necessity for a different jig for each piece of work or each different requirement for the same pieces of work.

A further object is to provide a jig plate accurately drilled to provide rows of pilot holes arranged with the holes of each row spaced apart at different distances apart but with the holes of one or more rows spaced apart at progressively increasing distances, the holes in one or more other rows uniformly spaced apart but not necessarily at the same distances apart in said last mentioned rows. In such an arrangement of holes the endmost holes of each row are at fixed distances from the adjacent margins of the jig plate and the rows of holes are likewise at fixed distances apart as are also the axes of the rows of holes from adjacent lateral margins of the plate.

Thus it is possible to insert pilot bushings in certain holes and plugs of known diameter in other holes of the same or different rows and thereby to accurately locate a piece of work with certain of its surfaces engaging said plugs while other surfaces of the work engage gauge blocks at margins or on the surface of the jig plate so that the work may be clamped in position on the jig to receive a drill or drills extended through the pilot bushings for performing similar operations on successive identically treated parts. It is obvious that by the employment of gauge blocks, shims, bushings and plugs of known size and character the work may be readily adjusted on the jig to any position desired for drilling holes therein of desired size and at desired locations without reliance upon individual reading and setting of micrometers and consequent inaccuracies and faulty parts.

The only calculations required are made by addition of known dimensions, including hypothenuses or diagonal distances between holes of different rows, which dimensions can be readily tabulated for each jig and accompany each jig used. In the latter case it may be understood that my improvements include devices for selection of the proper holes in the jig to be used for the purpose of locating holes in the work when arranged in a circle of a given diameter and any number of holes in the circle, at least within reasonable limitations of a particular jig. The chordal distances between holes in circular arrangements are known factors and can also be tabulated and accompany each jig for ready reference and economy in time, labor and avoidance of unnecessary computations.

Other and important but subordinate objects may appear as the description progresses.

I have shown a preferred form of apparatus and accessories for providing the aforesaid results in the accompanying drawings, subject to modification and elaboration, within the scope of the appended claims, without departing from the spirit of the invention.

In said drawings:

Fig. 1 is a bottom plan view of a jig plate shown in position over and affixed to a piece of work;

Fig. 2 is a side elevation partly in sections of the same as when mounted on the table of a drill press;

Fig. 3 is a transverse section of the same on line 3—3 of Fig. 2;

Fig. 4 is a fragmentary section of a marginal portion of the jig plate showing one arrangement of gauge blocks and means for supporting said blocks on the jig in engagement with and for locating a piece of work relative to a margin of the plate;

Fig. 5 is a perspective exploded view of a stack of gauge blocks and shims of a total thickness required in a given case for locating a piece of work on the jig;

Figs. 6 and 7 are, respectively, similar cross sectional fragmentary views of different means of adaptation of plugs of known diameter in connection with and without the interposition of shims or gauges between portions of the plugs in holes of the jig and a piece of work;

Fig. 8 is a bottom plan view of the jig plate and necessary accessory devices superposed on a circular piece of work preparatory to drilling a plurality of holes in the work at uniform chordal distances apart as when arranged in a circle;

Figs. 9 and 10 are fragmentary cross sectional views of the jig on line 9—9 of Fig. 8 but showing different means of anchoring a piece of work on the jig plate;

Fig. 11 is a bottom plan view of the jig including a sine arm adjustable on the jig plate for locating holes in the work at selected angles and distances apart;

Fig. 12 is a fragmentary sectional view of the same on line 12—12 of Fig. 11;

Fig. 13 is a schematic plan view of the jig plate;

Fig. 14 is a schematic plan view of a matrix for and identical with the jig plate except for certain notations and legends necessary to expedite drilling operations through selection of proper holes in the jig plate for effecting certain operations;

Fig. 15 is a fragmentary plan view of the jig plate, matrix or other element bearing a diagram showing the hypotenusal designations between holes of one row and those of other rows of holes in the jig plate; and Fig. 16 is a fragmentary plan view of a sheet bearing hypotenusal dimensions indicated on the diagram of Fig. 15, for reference in determing the accurate location of a piece of work and a succeeding drilling operation.

First, referring particularly to Figs. 1 to 7, inclusive, my improved method and means for jig drilling pieces of work includes a jig plate J adapted to be superposed on or at least held on a piece of work W for attachment to the table T of a drill press or other machine tool bed to effect a drilling operation in accordance with predetermined size and positions of holes in the work. Other accessory devices such as conventional or special gauge block G (broadly designated herein), clamps C, pilot bushings B, plugs P, and otherwise as they may be hereinafter described are also shown and used in certain beneficial combinations which assure comprehensive adaptability and universality of the devices for various and numerous kinds of usage. In fact, my invention comprehends such a vast number of uses and characterizations that it is not possible or necessary herein to name or describe all possible adaptations. Suffice it to illustrate and describe a few of the uses and modifications of a perferred type of apparatus and to give examples thereof herein.

As a major feature in the rank of importance of the components of my apparatus, the jig J is characterized by the provision of a plurality of parallel longitudinal rows of holes, in this case only three rows X, Y and Z being shown; all of said holes being of the same size—for example three-fourths of an inch in diameter, and referred to hereinafter in progressive order reading from left to right (Fig. 1) and designated progressively as $X_1$, $X_2$, $X_3$ etc., in row X; $Y_1$, $Y_2$, $Y_3$ etc., in row Y; and $Z_1$, $Z_2$, $Z_3$, etc., in row Z. While only three rows of holes are shown, obviously there may be more rows of similar holes if desired.

As shown, row X has eight holes arranged in a longitudinal line at equal distances from the adjacent margin 1 but spaced apart at progressively increasing distances from the first hole $X_1$ to the final hole $X_8$. Hole $X_1$ is shown as seven-eighths of an inch from end margin 2 and hole $X_8$ is one and one-half inches from the opposite end margin 3. The intermediate distances between adjacent holes $X_1$—$X_2$, $X_2$—$X_3$, $X_3$—$X_4$, $X_4$—$X_5$, $X_5$—$X_6$, $X_6$—$X_7$, $X_7$—$X_8$ are for example, respectively, 1, 1⅛, 1¼, 1⅜, 1½, 1⅝, 1¾ inches.

Hole $Y_1$ of row Y as shown is one inch from end margin 2 while the final hole $Y_{11}$ in said row is likewise one inch from end margin 3. The holes $Y_1$—$Y_2$, $Y_2$—$Y_3$, $Y_3$—$_4Y$, $Y_4$—$Y_5$, $Y_5$—$Y_6$, $Y_6$—$Y_7$, $Y_7$—$Y_8$, $Y_8$—$Y_9$, $Y_9$—$Y_{10}$, $Y_{10}$—$Y_{11}$ are, as shown uniformly spaced one inch apart.

Holes $Z_1$ to $Z_7$ in order are also progressively spaced apart decimally in order at 1.2, 1.3, 1.4, 1.5, 1.6 and 1.7 inches ascendingly, with hole $Z_1$ one inch from margin 2 and hole $Z_7$ is 2.3 inches from margin 4, as shown and when the length of plate J is one foot, rows of holes X and Z are three-fourths of an inch from margins 1 and 4, respectively while row Y is equidistant from rows X and Z.

Thus, with the series of holes X, Y and Z of known size and their respective locations on plate J also known with respect to the inter-row distances, distances from one to another in a row are computable by mere addition of the inter-hole distances between any two holes of a row, as well as the known transverse distances between the rows and the margins of the plate J. The hypotenusal distances from the center of any hole in any row to that of any hole in another row may be computed, although preferably a tabulated scale of hypotenusal distances between any two points on matrix M (Fig. 14), plate J (Fig. 1) are readily obtainable from scale S (Fig. 16) or diagram D (Fig. 15).

Thus, it will be observed that because of the fractional distances between any two holes in the rows X and Z for instance, I am enabled to obtain dimensions which at least nominally approach a desired dimension between holes to be drilled. For example the distance between holes $X_1$ and $X_4$ totals 3.375 inches; the distance between holes $X_1$ and $X_8$ is 9.625 inches; between holes $X_8$ and $X_6$ (from right to left) is 3.375 inches, etc.

In row Y the holes are all spaced at a distance of one inch from adjacent holes and integral dimensions from one to ten inches may be established therefrom.

Likewise in row Z in which the holes are decimally spaced increasingly from hole $Z_1$ to $Z_{11}$ in inches and tenths of an inch, or in centimeters and fractions thereof if desired, dimensions are established in accordance with the metric system of measurement.

As shown in Fig. 1 a flat piece of work W is held on the bottom of plate J between upright legs 5, 5 of special gauge blocks $G_1$, $G_1$ on one side and a head 6 of a clamping screw 7 which is adjustably borne by a special gauge block $G_1$ at the margin 1 transversely opposite blocks $G_1$, $G_1$. Thus, the work W is fixed in position transversely of the plate. The left hand edge of work W abuts a plug P held in hole $Y_5$ and is so held by means of an eccentric cam 8 affixed to or integral with another plug P seated in hole $Y_9$ and bearing against the right hand edge of work when said cam is appropriately turned as by means of a handle 9. The work is now held firmly in its established position on plate J by clamps C, C and bolts 10, 10 extended through said clamps and also through tapped holes 11, 11 of which there are two longitudinal rows in the form of jig shown.

Let it be assumed that it is desired to drill two identical holes spaced apart to correspond to holes $Y_6$ and $Y_7$ in the plate J. In such case bushings B, B are seated in the holes $Y_6$ and $Y_7$ and have bores of proper size to accommodate an appropriate drill E. Blocks $G_1$ are held by cap screws 12, 12, which are in this case extended through bores 13 in the right angular bases 5', of blocks $G_1$ and into tapped holes 14 open at the edges of plate J. (See Figs. 1, 2 and 3.) Blocks $G_1$ have bores 15 in their legs 5 to receive cap screws 12a when the blocks are positioned as in Fig. 4 with their bases 5' underlying the plate 5 and their upright legs 5 abutting an edge of plate J and secured to said plate by screws 12a. Bases 5' of said blocks are bored at 16 to receive cap screws 17 for attachment to and supporting a gauge $G_2$ of nominal thickness with or without a thinner gauge of fractional thickness between block $G_1$ and the adjacent margin of work W.

Thus, as shown in Fig. 3 blocks $G_1$ may be secured at their bores 5' to the edge of plate J and their legs 5 in the plane of the work; or as shown in Fig. 4 said blocks may be reversely positioned; or said blocks may be attached at their bases to said plate and their legs 5 extended above the surface of the plate and a surface flush with the edge of or spaced outwardly from the base to permit a slight overhang of the work beyond the margin of the plate.

Clamps C are affixed adjustably to plate J as by means of screws 18 which serve as adjustors for tightly adjusting the clamping plates C in contact with a surface of the work. Bolt 7 preferably carries a lock nut 7a at a point adjacent leg 5 of block $G_1$ for retaining said bolt in position against the adjacent margin of the work.

As shown in Fig. 6 when a plug P is of less diameter than necessary to accurately locate a piece of work relative to the holes X, Y and Z in plate J a shim as at $G_3$ of fractional and desired thickness may be inserted between the work and such plug. Also, if a plug is too large, as shown in Fig. 7, the extended portion 19 thereof may be reduced in diameter to a sufficient extent where said reduced portion will directly engage the work W. Preferably each complete kit of accessories would include plugs of different characteristics such as mentioned to meet varying requirements of use and facilitate drilling operations to a maximum extent.

Now by reference to Figs. 8 to 10 inclusive, it will be noted that a piece of work W' in the form of a circular disc or other form of work W' is affixed to the jig plate J by an axial pin 20 extended through a bushing $B_2$ which is held in the central hole $Y_6$ of said plate so that the disc may be rotated on the jig in order to drill a circular or arcuate series of holes in the disc of a given number and size by use of such holes in the jig as may be determined to be proper for spacing the drilled holes chordally at required distances apart. Preferably spacers A, A, may be held between the jig and the work to permit insertion of a gauge G.

While the disc W' is rotatable on the plate J for properly locating the holes to be drilled therein it is clamped in successive fixed positions by a pair of clamps C, C, after the selection of a proper hole of the series X, Y or Z has been made and measured from the hole $Y_6$ or any other selected hole as the axis of the disc by computation of the hypotenusal or straight line distance between the axis hole and the proposed circle of holes. As shown, the hole $Y_3$ has been selected as the drilling hole to be used for all holes in the proposed circle. By reference to Figs. 1 and 14 it will be noted that the distance between holes $Y_3$ and $Y_6$ is exactly three inches, hence the radius of the proposed holes H, H, etc., shown in Fig. 8 should be three inches.

A first hole $H_1$ in longitudinal alinement with axis pin 20 is drilled by employment of a pilot bushing B in hole Y (Fig. 9). Thereafter a capped pin $P_2$ is inserted in the hole $H_1$ thus drilled and a gauge plug $P_1$ is inserted in hole $Y_3$ after removal of bushing B (Fig. 9a). As shown, a plurality of gauges of different but known thickness having a total thickness equalling the chordal distance between the head of pin $P_2$ and gauge plug $P_1$ are clamped together by a screw clamp E and placed in position over the work W' while commonly mounted on a rod 22, with rod 22 resting against the head of temporary pin 21 and the surface of one endmost gauge also engaging plug $P_1$. Plug $P_1$ is then replaced by a bushing B and drill is lowered through said bushing against and for drilling a second hole $H_2$. Other holes H in succession are similarly located and drilled in the work W' by rotating the disc W' on the jig plate J or vice versa.

Chordal distances between holes of any number in a circle are readily obtainable from established computations in tabular form, and the only computations necessary are to deduct the known radius of the drill and pin 21, or the diameter or either, from the known chordal spacing of the holes H.

Pins 20 may be made with one portion 20a seatable in the bushing $B_2$ and another eccentrically offset portion 20b engageable with a central hole in the work $W_2$ as distinguished from the coaxial portions shown in Fig. 10. In such case the known dimension between the offset axes of the portions 20a and 20b can supply any deficiency in the requisite distance between the axis of the disc and any selected pilot hole in plate P for use in drilling a series of circularly arranged holes in the work. Thus, if the actual dimension of the used axis hole from any other hole in the plate is slightly more or less than the radius of the proposed circle of holes the location of 21 relative to a selected pilot hole will reconcile the dimensions of the two elements. Pins 21 may be made in sets with graduated offset dimensions or specially made for each proposed operation and should rotatably receive the work while being nonrotatable on the plate J.

My improved apparatus is adapted for use in connection with a sine bar for establishing requisite angles for tapered products and includes in addition to the devices heretofore described only a sine bar S which is shown in Figs. 11 and 12 as operatively mounted on the jig plate J. Said bar is elongated and has parallel edges 23 and 24 and a right angular extension 25 near one end pivotally engaging a pin or stud 26 which seats in one of the holes as at $Y_{11}$ of plate J, thereby providing an axis on which bar S may be swung at any desired angle on plate J in order to dispose an edge thereof (the inner edge as shown in Fig. 11) at any desired angle on plate J. A clamp C may be used to retain bar S at a desired angle in accordance with a desired taper to be produced on a piece of work.

The number of pilot holes, separate rows of holes and the differential spacing of the holes in the rows combine to produce a multiplicity of dimensional possibilities by the use of or without computations, in determining angles of different degrees of taper. The free end of the bar when appropriately swung into engagement with a plug P of known diameter held in one of the holes in plate J, as for instance in hole $Y_1$ of row Y will of course define a straight angle longitudinally of plate J especially because pin 26 and plug P in hole $Y_1$ are of identical size. Any desired angle, however, slight it may be, may correspondingly be defined by either of the edges 23 or 24 of bar S by the employment of gauges $G_1$ of a required number and preselected total thickness to define a chord of an arc of desired extent positioned between the plug P and the edge of bar S. In this case, as in the form of Fig. 8, the plurality of gauges are held on a rod $22a$ and are clamped together by a clamp E. When a desired angle is established the sine bar S is clamped to plate J by a clamp C and so held during the scribing or drilling or cutting of the taper on a piece of work as the case may be. Thus, the bar S serves as a protractor by the use of which holes may be located and drilled at various locations and at different angles from any or different points within the range of plate J. In the establishment of the bar S at a desired angle reference may be had to readily obtainable predetermined factors of tabular form.

Obviously, bar S may be hinged to plate J in any desired hole of the rows X, Y and Z found to be advantageous for a desired operation. Any combination of holes X, Y and Z will afford an angle from any other combination of holes. In fact the arrangement herein shown can provide approximately six hundred combinations capable of defining that number of different predetermined angles.

Matrix M (Fig. 14) is formed of thin sheet material and constitutes a pattern for the jig plate J. To such end said matrix or master pattern has the same number of rows of holes or markings at X', Y' and Z', spaced apart exactly in accordance with said jig plate, and, additionally bears legends and dimensions between holes in a row, between the endmost holes of each row and the adjacent edge of the plate, between the rows of holes and the lateral edges of the sheet, between the rows of holes and if desirable the cumulative dimensions between the first and succeeding holes of a row. Thus, when the matrix is laid upon the face of plate J the proper hole or holes for a succeeding drilling operation may be selected and noted for use, after which the matrix is removed from the plate and the work secured to the plate as shown and described.

It will be apparent that the size and characteristics of the jig plate and associated devices are shown and described herein in as of a particular form for purpose of illustration and description of one form of the invention, and that the same may be modified by enlargement or decrease in size, number of rows of pilot holes, number of holes in the rows, inter-hole and inter-row dimensions and otherwise, to meet varying requirements for drilling different forms and size of work. Usual preliminary layouts, templates, scribing and center punching of the work is unnecessary because the associated devices disclosed enable a mechanic with but little if indeed any simple arithmetical calculations to operate directly on the work with a minimum of preliminary operations and by ready adjustment of appropriate devices including standard gauges of known dimensions, to eliminate all possibility of error such as is frequently occasioned by reliance upon accurate setting and reading of micrometers.

I claim:

1. A drilling jig comprising: a jig plate having a plurality of parallel rows of holes therein arranged with the holes of individual rows differently spaced apart than the holes of other rows, a pilot bushing insertible in a selected hole of one row, means for affixing a piece of work to said plate preparatory to a drilling operation, and means including gauges of fixed dimensions attachable to the marginal portions of said plate and plugs insertible in selected holes of said plate engaging and between which said piece of work may be located on the plate in accordance with predetermined location of a hole to be drilled in the work at the location of said pilot bushing.

2. A drilling jig as characterized in claim 1 in which said jig plate has threaded holes therein open at the edges and other similar holes open at a face of said plate, certain of said gauges being of L shape and arranged to abut an edge of said plate at a selected surface of the legs or feet and having bores through their legs and feet to receive screws for extension into the threaded holes of said plate, whereby to attach said L shaped gauges selectively in disposition relative to and their location on said plate.

3. A drilling jig as characterized in claim 1 in which said jig plate has the holes in at least one row of holes in said plate progressively spaced apart at increasing distances.

4. A drilling jig as characterized in claim 1 in which said jig plate has the holes in at least one row of holes in said plate progressively spaced apart at increasing distances, while the holes of another row are uniformly spaced apart from the initial to the final hole in the row.

5. A drilling jig as characterized in claim 1 including means for rotatably supporting a piece of work relative to a selected hole of said plate preparatory to drilling an arcuate series of holes in the work, pins insertible in an initial drilled hole of the work, and means including a plurality of gauges of different thickness which together have a thickness corresponding to the chordal distance between said pin and an approciate drill which when positioned between said pin and said drill will accurately position the drill for drilling of a succeeding hole in the work at a designated chordal distance from the first and successive holes in order.

6. A drilling jig as characterized in claim 1 including a sine bar superposed on said plates, means for rotatably supporting said bar in a selected hole of said plate for traverse of the plate and the work, a first gauge element in another selected hole of said plate, and a second gauge means borne by said bar and cooperating with and when engaged with said first gauge element adapted to dispose said bar at an angle corresponding to the chord measured by said first and second gauge means.

7. A drilling jig as characterized in claim 1 in which the lineal distances between any two holes in a row, the fixed distances between rows of holes, and the hypotenusal distances between holes of different rows serving as factors which by computation or reference to preestablished tabulations enable an operator to adjust the work relative to said plate to accurately locate and drill holes in the work in accordance with a preconceived plan.

8. A drilling jig as characterized in claim 1 including a master plate or matrix marked or drilled corresponding to the jig plate and adapted when laid upon the jig plate and bearing hole designations and dimensional notations to facilitate the selection of certain holes in the jig plate for use in a proposed drilling operation, said master plate being removable prior to such operation.

9. A drilling jig as characterized in claim 1 including a sine bar superposed on said plates, means for rotatably supporting said bar in a selected hole of said plate for traverse of the plate and the work, a first gauge element in another selected hole of said plate, and a second gauge means borne by said bar and cooperating with and when engaged with said first gauge element adapted to dispose said bar at an angle corresponding to the chord measured by said first and second gauge means, said sine bar having a laterally offset portion, a pin extending through said offset portion into a selected hole of said jig plate and providing an axis about which said bar is rotatably adjustable for disposing an edge of said bar from a position of parallelism with the row of holes of which said axis hole is one to any angle from said row of holes, and means for clamping said bar in a selected position on said jig plate.

10. A jig plate of elongated rectangular form provided with a first longitudinal row of pilot holes of uniform diameter at a fixed distance from one longitudinal edge thereof and arranged at progressively increasing distances apart as measured in whole units of measurement and fractions thereof from a first to a last hole in the row, and having other parallel rows of pilot holes longitudinally spaced apart at different distances than the holes in said first row, the first and final holes in all of said rows being at different distances from corresponding ends of said jig plate, none of the corresponding holes in said rows being transversely alined, and means attachable to said jig plate for selectively locating and supporting a piece of work on said jig plate relative to selected pilot holes preparatory to a drilling operation according to a predetermined pattern.

11. A jig plate as characterized in claim 10, including a matrix bearing holes corresponding to the pilot holes of said jig plate together with dimensional notations and adapted when laid upon the jig plate to facilitate selection of requisite pilot holes for use in a proposed drilling operation.

12. A jig plate as characterized in claim 11 in which none of the corresponding holes in said rows being transversely alined, means attachable to said jib plate for selectively locating and supporting a piece of work on said jib plate relative to selected pilot holes preparatory to a drilling operation according to a predetermined pattern, and a plurality of gauges having different form and characteristics attachable to the edges and a face of said plate and also at selected pilot holes therein for abutment with surfaces of and for locating a piece of work on the plate for drilling the work.

13. A jig plate as characterized in claim 10 including clamping devices for supporting the work in position on the jig plate between said gauges.

14. A jib plate of elongated rectangular form provided with a first longitudinal row of pilot holes of uniform diameter at a fixed distance from one longitudinal edge thereof and arranged at progressively increasing distance apart as measured in whole units of measurement and fractions thereof from a first to a last hole in the row, and having other parallel rows of pilot holes longitudinally spaced apart at different distances than the holes in said first row, the first and final holes in all of said rows being at different distances from corresponding ends of said jig plate, none of the corresponding holes in said rows being transversely alined, means attachable to said jig plate for selectively locating and supporting a piece of work on said jig plate relative to selected pilot holes preparatory to a drilling operation according to a predetermined pattern, said work supporting means including a pin insertible in a selected pilot hole for rotatably supporting the work between successive drilling operations of a series and for inmovably holding the work during each hole drilling operation, and gauge means for indexing the rotary movement of the work from hole to hole in a series of arcuately arranged holes.

15. A jig plate of elongated rectangular form provided with a first longitudinal row of pilot holes of uniform diameter at a fixed distance from one longitudinal edge thereof and arranged at progressively increasing distance apart as measured in whole units of measurement and fractions thereof from a first to a last hole in the row, and having other parallel rows of pilot holes longitudinally spaced apart at different distances than the holes in said first row, the first and final holes in all of said rows being at different distances from corresponding ends of said jig plate, none of the corresponding holes in said rows being transversely alined, means attachable to said jig plate for selectively locating and supporting a piece of work on said jig plate relative to selected pilot holes preparatory to a drilling operation according to a predetermined pattern, a sine bar having a straight edge laterally offset from an axis of rotation and coincidental with a selected pilot hole of a row, and cooperating first and second gauge elements in another hole of the same row and insertible between said first gauge element and said straight edge, respectively for disposing said bar at the angle corresponding to the chord established by said gauge elements.

HERMAN G. ALTENBURGER.

References Cited in the file of this patent

UNITED STATES PATENTS

| Number | Name | Date |
| --- | --- | --- |
| 1,954,708 | Mass | Apr. 10, 1934 |
| 2,273,954 | Grass | Feb. 24, 1942 |